US009755779B2

United States Patent
Zeng et al.

(10) Patent No.: US 9,755,779 B2
(45) Date of Patent: Sep. 5, 2017

(54) DIGITAL REPRESENTATIONS OF ANALOG SIGNALS AND CONTROL WORDS USING DIFFERENT MULTI-LEVEL MODULATION FORMATS

(71) Applicant: Futurewei Technologies, Inc., Plano, TX (US)

(72) Inventors: Huaiyu Zeng, Red Bank, NJ (US); Xiang Liu, Marlboro, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/853,478

(22) Filed: Sep. 14, 2015

(65) Prior Publication Data

US 2016/0308641 A1 Oct. 20, 2016

Related U.S. Application Data

(60) Provisional application No. 62/149,039, filed on Apr. 17, 2015.

(51) Int. Cl.
*H04B 10/00* (2013.01)
*H04J 14/08* (2006.01)
(Continued)

(52) U.S. Cl.
CPC ...... *H04J 14/086* (2013.01); *H04B 10/25753* (2013.01); *H04B 10/5053* (2013.01);
(Continued)

(58) Field of Classification Search
CPC .................. H04L 5/0044; H04W 72/0453
(Continued)

(56) References Cited

U.S. PATENT DOCUMENTS 7,382,805 B1 * 6/2008 Raza .................. H04L 65/607
341/58
7,813,271 B2 * 10/2010 Fourcand ............ H04L 1/0086
370/228
(Continued)

FOREIGN PATENT DOCUMENTS

| CN | 1812292 A | 8/2006 |
|---|---|---|
| CN | 103401613 A | 11/2013 |
| CN | 103441799 A | 12/2013 |

OTHER PUBLICATIONS

Foreign Communication From a Counterpart Application, PCT Application No. PCT/CN2016/079297, English Translation of International Search Report dated Jul. 7, 2016, 7 pages.
(Continued)

*Primary Examiner* — Daniel Washburn
*Assistant Examiner* — Berhanu Tadese
(74) *Attorney, Agent, or Firm* — Conley Rose, P.C.

(57) ABSTRACT

A method implemented by a transmitter, comprising encoding digital in-phase and quadrature-phase (IQ) data associated with a plurality of analog signals according to a first multi-level modulation format to produce a modulated IQ signal, encoding control information associated with the plurality of analog signals according to a second multi-level modulation format that is different from the first multi-level modulation format to produce a modulated control signal, aggregating the modulated IQ signal and the modulated control signal via time-division multiplexing (TDM) to produce an aggregated TDM signal, and transmitting the aggregated TDM signal over a communication channel.

22 Claims, 11 Drawing Sheets

(51) Int. Cl.
   *H04B 10/556*    (2013.01)
   *H04J 3/16*      (2006.01)
   *H04W 72/04*     (2009.01)
   *H04L 25/03*     (2006.01)
   *H04B 10/2575*   (2013.01)
   *H04B 10/50*     (2013.01)
   *H04W 88/08*     (2009.01)

(52) U.S. Cl.
   CPC ........ *H04B 10/5561* (2013.01); *H04J 3/1694* (2013.01); *H04L 25/03* (2013.01); *H04W 72/0413* (2013.01); *H04W 88/085* (2013.01)

(58) Field of Classification Search
   USPC .......................................................... 375/298
   See application file for complete search history.

(56) References Cited

U.S. PATENT DOCUMENTS

| | | | | |
|---|---|---|---|---|
| 8,675,754 | B1* | 3/2014 | Yonge, III | H04L 27/183 375/261 |
| 9,319,139 | B2* | 4/2016 | Effenberger | H04B 10/2581 |
| 2005/0163071 | A1* | 7/2005 | Malladi | H04J 13/00 370/328 |
| 2006/0262871 | A1* | 11/2006 | Cho | H04L 5/0044 375/260 |
| 2007/0116046 | A1* | 5/2007 | Liu | H04J 3/1617 370/466 |
| 2008/0225816 | A1* | 9/2008 | Osterling | H04J 3/0682 370/342 |
| 2009/0073922 | A1* | 3/2009 | Malladi | H04L 1/0004 370/328 |
| 2010/0103901 | A1* | 4/2010 | Miki | H04L 1/0003 370/330 |
| 2010/0195583 | A1* | 8/2010 | Nory | H04L 1/1854 370/329 |
| 2010/0195624 | A1 | 8/2010 | Zhang et al. | |
| 2011/0032910 | A1* | 2/2011 | Aarflot | H04J 3/0682 370/335 |
| 2012/0044927 | A1* | 2/2012 | Pan | H03M 3/47 370/345 |
| 2012/0057572 | A1* | 3/2012 | Evans | H04W 88/085 370/338 |
| 2012/0177372 | A1* | 7/2012 | Liu | H04B 10/5053 398/65 |
| 2013/0163524 | A1* | 6/2013 | Shatzkamer | H04L 69/22 370/329 |
| 2013/0329633 | A1* | 12/2013 | Dalela | H04L 12/4633 370/328 |
| 2014/0064214 | A1* | 3/2014 | Papasakellariou | H04L 5/0053 370/329 |
| 2014/0192796 | A1* | 7/2014 | Zhang | H04W 28/0205 370/350 |
| 2014/0269639 | A1* | 9/2014 | Heo | H04L 1/0004 370/336 |
| 2014/0328601 | A1* | 11/2014 | Cavaliere | H04B 10/5561 398/188 |
| 2015/0071641 | A1* | 3/2015 | Wen | H04B 10/5165 398/98 |
| 2015/0162970 | A1* | 6/2015 | Kamalizad | H04B 3/54 375/267 |
| 2015/0207740 | A1* | 7/2015 | Jamond | H04L 69/04 398/58 |
| 2015/0280826 | A1* | 10/2015 | Effenberger | H04B 10/2581 398/66 |
| 2015/0326422 | A1* | 11/2015 | Sagong | H04L 27/38 375/298 |
| 2015/0365934 | A1* | 12/2015 | Liu | H04L 5/0039 370/329 |
| 2016/0065325 | A1* | 3/2016 | Cavaliere | H04B 10/5161 398/65 |
| 2016/0204873 | A1* | 7/2016 | Perez De Aranda Alonso | H04L 27/38 398/43 |

OTHER PUBLICATIONS

Foreign Communication From a Counterpart Application, PCT Application No. PCT/CN2016/079297, English Translation of Written Opinion dated Jul. 7, 2016, 3 pages.

"Common Public Radio Interface (CPRI); Interface Specification," CPRI Specification V6.1 (Jul. 1, 2014), 129 pages.

Liu, et al., "Aggregated Touchless Wireless Fronthaul," U.S. Appl. No. 14/528,823, filed Mar. 20, 2015, Specification 48 pages with 26 pages of drawings.

* cited by examiner

DIGITAL REPRESENTATIONS OF ANALOG SIGNALS AND CONTROL WORDS USING DIFFERENT MULTI-LEVEL MODULATION FORMATS

CROSS-REFERENCE TO RELATED APPLICATIONS

The present application claims priority to U.S. Provisional Patent Application 62/149,039, filed Apr. 17, 2015 by Huaiyu Zeng and Xiang Liu, and titled "Transmission of Digital Representations of Analog Signals and Control Words in a Communication Channel Using Different Multi-Level Modulation Formats," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) refers to a network between mobile devices or mobile stations, such as mobile phones, personal digital assistants (PDAs), laptops, or any user equipment, and a core network. In traditional wireless macro-cell networks and mobile macro-cell networks, an area may be divided geographically into a plurality of cells and cell sectors, each served by a wireless base station communicating with a core network. The part of the RAN between the wireless base stations and the core network is referred to as the wireless backhaul. As the demand for high-speed wireless communications continues to increase, reaching the limits of macro cells in terms of the number of locations and penetration capability in indoor or densely-populated areas, research and industry are moving towards small-cell deployments with denser and smaller cells in future wireless access networks.

Wireless fronthaul or mobile fronthaul is an emerging network segment that enables a cloud-RAN (C-RAN) architecture suitable for small-cell deployments. In a C-RAN architecture, the digital baseband (BB) processing that is typically performed at wireless base stations located at remote cell sites is relocated to centralized baseband units (BBUs) located at a central site near a central office (CO) or a core network. As such, the wireless base stations located at the remote cell sites are replaced by remote radio units (RRUs) that interface with antennas for wireless radio frequency (RF) transmissions and receptions without the digital BB processing. Wireless fronthaul refers to the part of the RAN between the RRUs and the BBUs. By relocating the digital BB processing to the centralized BBUs, the C-RAN architecture may enable resource sharing and coordinated multipoint (CoMP) processing, such as joint signal processing, joint interference mitigation, and/or joint scheduling among multiple cells, and thus may improve network performance and efficiency.

Wireless fronthaul may be enabled by optical fiber communication technologies, where optical fiber links are employed for transporting signals between the RRUs located at the remote cell sites and the BBUs located at the central site. Some advantages of optical fiber transmission include low power loss, low latency, and high bandwidths (BWs). However, the employment of optical fibers and optical hardware add cost to the wireless fronthaul network. Thus, efficient usage of optical fiber links and optical hardware are important in wireless fronthaul design.

SUMMARY

In one embodiment, the disclosure includes a method implemented by a transmitter, comprising encoding digital in-phase and quadrature-phase (IQ) data associated with a plurality of analog signals according to a first multi-level modulation format to produce a modulated IQ signal, encoding control information associated with the plurality of analog signals according to a second multi-level modulation format that is different from the first multi-level modulation format to produce a modulated control signal, aggregating the modulated IQ signal and the modulated control signal via time-division multiplexing (TDM) to produce an aggregated TDM signal, and transmitting the aggregated TDM signal over a communication channel.

In another embodiment, the disclosure includes an apparatus comprising a processor configured to encode digital in-phase and quadrature-phase (IQ) data associated with a plurality of analog wireless signals according to a first multi-level modulation format to produce a modulated IQ signal, encode control words (CWs) comprising control information associated with the plurality of analog wireless signals according to a second multi-level modulation format that is different from the first multi-level modulation format to produce a modulated CW signal, and aggregate the modulated IQ signal and the modulated CW signal through time-division multiplexing (TDM) to produce an aggregated TDM signal, and a frontend coupled to the processor and configured to transmit the aggregated TDM signal over a communication link.

In yet another embodiment, the disclosure includes an apparatus comprising a frontend configured to receive a single-carrier signal carrying a multiplexed signal comprising an in-phase and quadrature-phase (IQ) data portion and a control word (CW) portion, wherein the IQ data portion comprises digital IQ data associated with a plurality of analog wireless signals, and wherein the CW portion comprises CWs comprising control information associated with the plurality of analog wireless signals, and a processor coupled to the frontend and configured to update a channel equalizer according to the CW portion, perform channel equalization on the multiplexed signal according to the channel equalizer, obtain the digital IQ data from the IQ data portion according to a first multi-level modulation format, and obtain the CWs from the CW portion according to a second multi-level modulation format that is different from the first multi-level modulation format.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One approach to providing wireless fronthaul is to employ wavelength-division multiplexing (WDM) to carry signals between remote radio units (RRUs) and baseband units (BBUs). However, this approach may be expensive with the expansion of small cells. Another approach is to digitize the wireless channel signals received from the RRUs and/or the BBUs and transport digitized data between the RRUs and the BBUs via a binary modulation format. However, this approach may not be bandwidth-efficient. A more efficient and less expensive approach may be to perform aggregation and deaggregation in a digital domain with multi-level modulation.

For example, analog wireless channel signals are represented digitally and aggregated in a digital domain. Thus, the main function of a wireless fronthaul is to transmit digital representations of the analog wireless channel signals and control information associated with the analog wireless channel signals. The digital representations of the analog wireless channel signals may be in the form of digitized in-phase (I) and quadrature-phase (Q) components of the analog wireless channel signals in the baseband (BB) or in an intermediate frequency (IF). The digitized I and Q components may be referred to as digital IQ data or IQ data in the present disclosure. The control information may be in the form of CWs and may be used for equipment control and management (C&M) purposes. RAN equipment commonly employs a common public radio interface (CPRI) protocol as defined in CPRI specification V6.1, 2014, which is incorporated herein by reference, to transmit radio frequency (RF) signals between RRUs and interface units. The CPRI protocol may also be employed for wireless fronthual transmission. However, the CPRI protocol may not be efficient. For example, the CPRI protocol transmits IQ data and CWs based on binary modulation. When an optical link is used, the IQ data and the CWs are transmitted by employing on-off-keying (OOK), which transmits one bit per modulation symbol.

Figure 1:
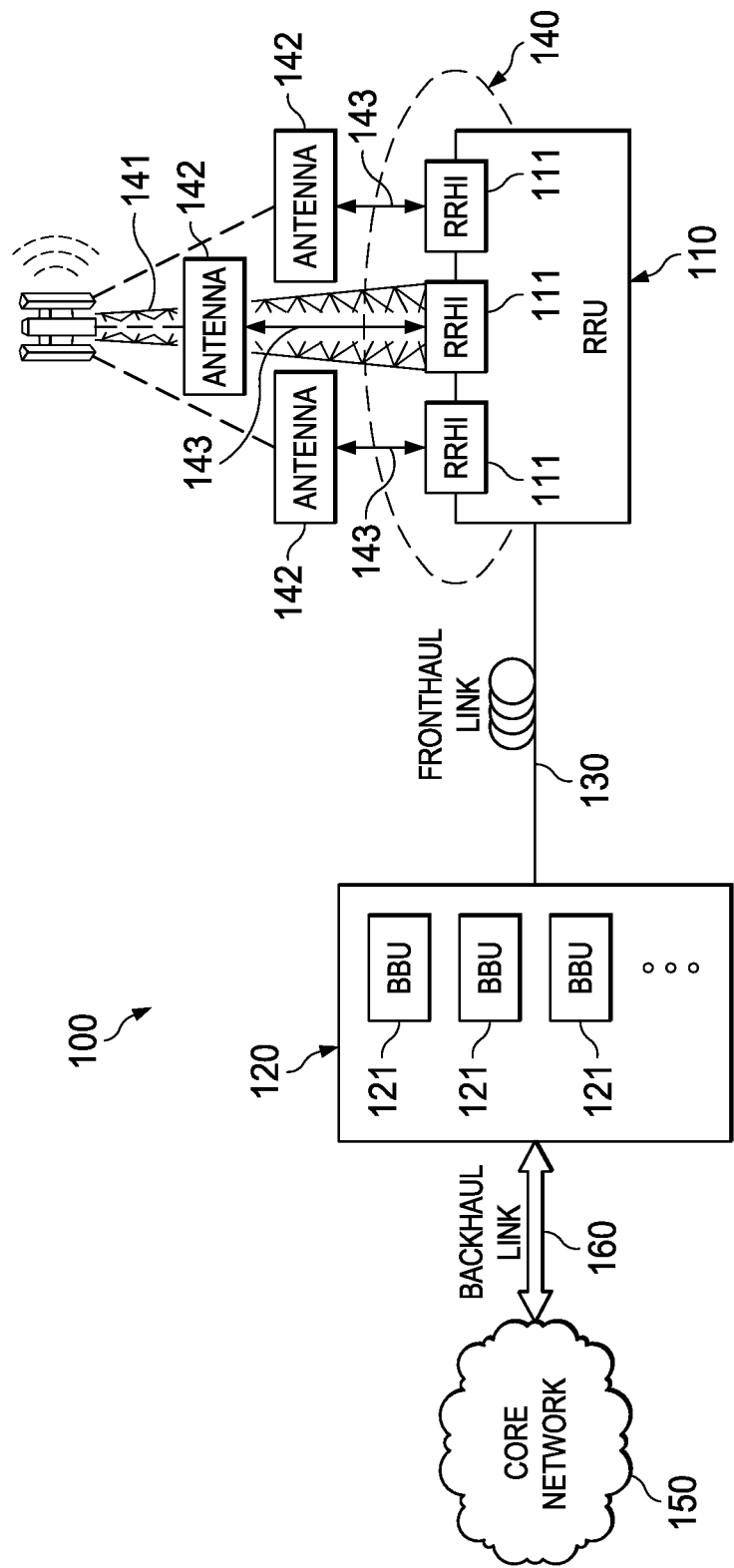
FIG. 1 is a schematic diagram of a cloud-radio access network (C-RAN) system.

FIG. 1 is a schematic diagram of a C-RAN system 100. The system 100 is suitable for implementing the disclosed embodiments. The system 100 comprises an RRU 110 communicatively coupled to a BBU pool 120 through a fronthaul link 130. The RRU 110 is located at a cell site 140. For example, the RRU 110 is installed at the bottom of a cell tower 141 that holds a plurality of antennas 142. The BBU pool 120 may be located at a central office (CO) site (not shown). The BBU pool 120 connects the RRU 110 to a core network 150 via a backhaul link 160. The cell site 140 is a geographical area located at a remote location away from the CO site and may comprise one or more cell sectors, which may be determined during network deployment by mobile operators. The system 100 is commonly deployed for small-cell networks. Thus, the cell site 140 may cover an area with a radius in the order of hundreds of meters (m). The cell tower 141 is an elevated structure configured to hold radio communication equipment, such as antennas 142, for communicating to mobile stations (not shown) located within the coverage of the antennas 142. The antennas 142 are electrical devices, such as directional antennas, omnidirectional antennas, or antenna array structures, configured to convert electrical power into radio waves, and vice versa. For example, the antennas 142 may be positioned at the top of the cell tower 141 to generate a wireless RF coverage in the cell site 140. The core network 150 is a central part of a network that provides network services to the users of the mobile stations. The core network 150 may comprise one or more interconnected sub-networks operated by one or more network providers and/or service providers. The fronthaul link 130 may be a cable link, a free-space link, or an optical fiber link configured to transport digital baseband signals between the RRU 110 and the BBU pool 120. A cable link comprises coaxial cables. A free-space link comprises a line-of-sight radio waves propagation path. An optical fiber link may comprise a standard single-mode fiber (SSMF) or a multi-mode fiber (MMF). Since optical fibers provide significantly lower power loss, higher speed, and higher bandwidth (BW) than cables, optical fibers are commonly employed for the fronthaul link 130 instead of cables. The backhaul link 160 is substantially similar to the fronthaul link 130, but transport packets, such as Ethernet packets, between the BBU pool 120 and the core network 150.

The RRU 110 comprises a plurality of RRH interfaces (RRHIs) 111 communicatively coupled to the antennas 142. Each antenna 142 is configured to operate in a wireless RF channel, which may be an uplink (UL) channel or a downlink (DL) channel. UL refers to the transmission direction from mobile stations to a CO or a CO site, whereas DL refers to the transmission direction from the CO or the CO site to the mobile stations. Some examples of wireless RF channels may include long-term evolution (LTE) channels, LTEadvanced (LTE-A) channels, or other evolved universal terrestrial radio access (E-UTRA) channels as defined in the third generation partnership project (3GPP) specifications. The wireless RF channels may span various RF bands with various BWs. Some examples of LTE BW configurations may include 1.4 megahertz (MHz), 3 MHz, 1 MHz, 10 MHz, 15 MHz, and 20 MHz. It should be noted that in the case of a multiple-input and multiple-output (MIMO) transmission scheme, each input channel or each output channel is referred to as an RF channel in the present disclosure. For example, to support an 8×8 MIMO transmission scheme, the RRU 110 is configured to process 8 RF input channels and 8 RF output channels. The RRHIs 111 and the antennas 142 are connected via RRHI links 143. The RRHI links 143 may comprise optical fibers, such as SSMFs or MMFs, RF cables, or free-space microwave connections, and may carry an RF signal in an optical signal, for example, according to a particular RF interface protocol.

The RRU 110 is configured to serve a plurality of mobile stations located in the cell site 140 and within the coverage area of the antennas 142. Each antenna 142 communicates with one or more of the mobile stations. For example, a mobile station transmits UL RF signals in a designated UL RF band and receives DL RF signals from a designated DL RF band, where one antenna 142 is configured to receive the UL RF signals in the UL RF band and another antenna 142 is configured to transmit the DL RF signals in the DL RF band. In a UL direction, the RRU 110 receives a UL RF signal from each antenna 142 via an RRHI 111 and downconverts the received UL RF signal to a BB to reduce processing rate. The RRU 110 aggregates the BB signals to produce an aggregated UL signal according to an UL channel aggregation scheme, which may employ various mechanisms, as discussed more fully below. The RRU 110 converts the aggregated UL signal into a UL optical signal and transmits the UL optical signal to the BBU pool 120.

In a DL direction, the RRU 110 receives a DL optical signal from the BBU pool 120 via the fronthaul link 130. The DL optical signal carries an aggregated DL signal. The RRU 110 converts the DL optical signal into electrical signals and performs channel deaggregation to extract DL BB signals from the aggregated DL signal according to a DL channel aggregation scheme, which may employ various mechanisms, as discussed more fully below. The RRU 110 upconverts the DL BB signal to corresponding DL RF bands that are employed for transmission over the antennas 142.

The BBU pool 120 comprises a plurality of BBUs 121 configured to perform BB DSP functions and wireless media access control (MAC) processing functions according to a wireless communication protocol. In the UL direction, when a BBU 121 receives the UL optical signal carrying the aggregated UL signal from the RRU 110 via the fronthaul link 130, the BBU 121 converts the optical signal into electrical signals. The BBU 121 performs channel deaggregation according to the UL channel aggregation scheme to extract the UL signals from the aggregated UL signal. The BBU 121 performs BB DSP functions and wireless MAC processing functions to recover the data packets transmitted over each of the wireless RF channels and sends the data packets to the core network 150 via the backhaul link 160. It should be noted that the received aggregated UL signal may be a composite intermediate-frequency (IF) signal and an intermediate frequency-to-baseband (IF-to-BB) conversion may be implemented as part of the channel deaggregation, as discussed more fully below.

In the DL direction, the BBU 121 receives DL packets from the core network 150 via the backhaul link 160, where the packets correspond to the wireless RF channels. The BBU 121 performs wireless MAC processing functions and BB DSP functions to produce digital BB signals. The BBU 121 then aggregates the digital BB signals according to the DL channel aggregation scheme to produce the aggregated DL signal, converts the aggregated DL signal into an optical signal, and sends the optical signal to the RRU 110. It should be noted that the aggregated DL signal is a composite IF signal and a BB-to-IF conversion may be implemented as part of the channel aggregation, as discussed more fully below. Although the above embodiments describe the BBU processing with respect to a BBU 121, some of the BBU processing may be distributed over multiple BBUs 121 located at the BBU pool 120 and may additionally include joint signal processing or coordinated multipoint (CoMP) functions across multiple RRUs, similar to the RRU 110, and/or multiple antennas, similar to the antennas 142.

Figure 2:
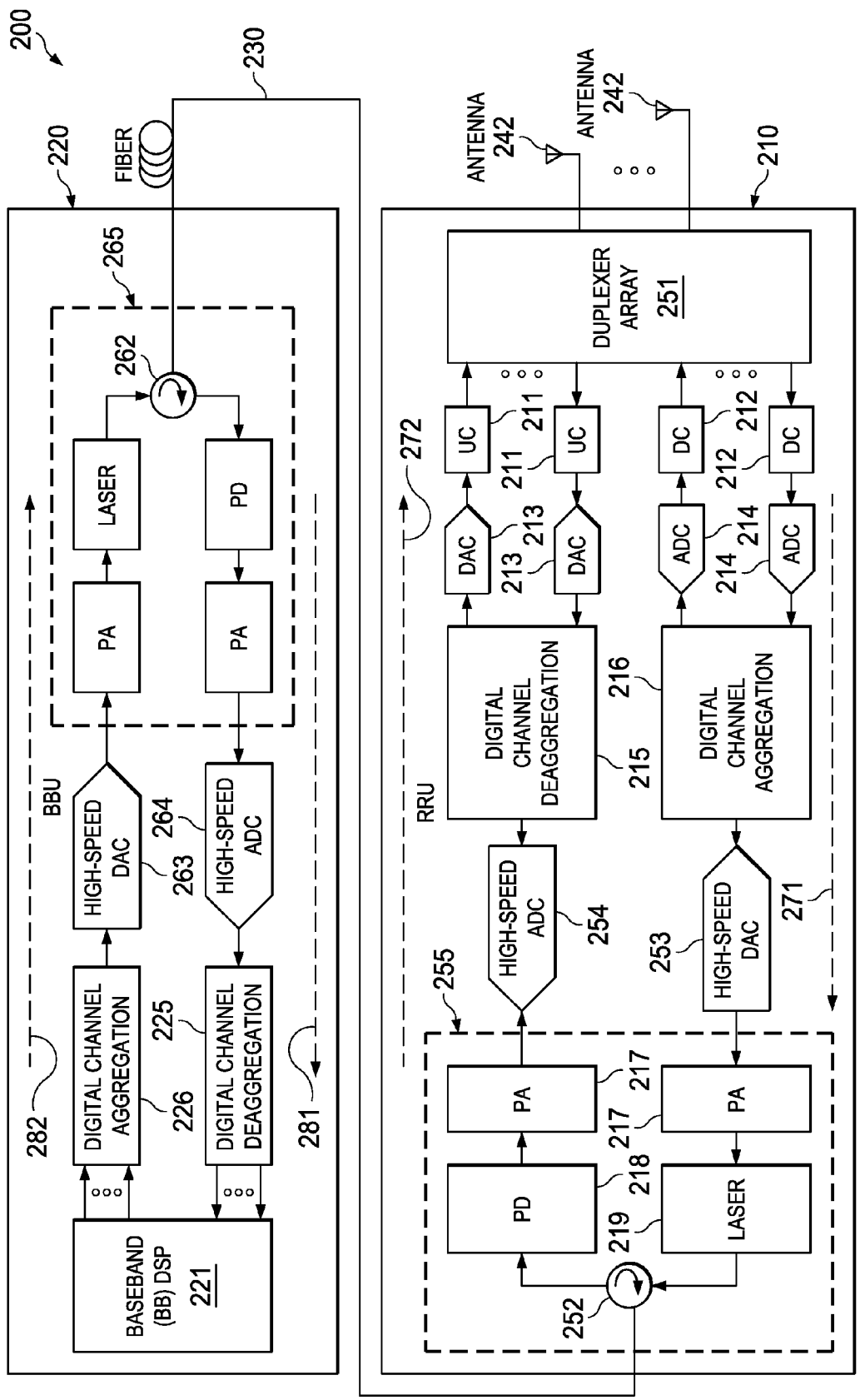
FIG. 2 is a schematic diagram of an aggregated wireless fronthaul communication system.

FIG. 2 is a schematic diagram of an aggregated wireless fronthaul communication system 200. The system 200 is described in U.S. patent application Ser. No. 14/528,823, which is incorporated herein by reference. The system 200 is similar to the system 100 and provides a more detailed view of the RRU 110 and the BBU 120. The system 200 comprises an RRU 210 communicatively coupled to a BBU 220 through a fronthaul link 230. The RRU 210, the BBU 220, and the fronthaul link 230 correspond to the RRU 110, the BBU 120, and the fronthaul link 130, respectively. In the system 200, both the RRU 210 and the BBU 220 perform channel aggregation and channel deaggregation in a digital domain and transport digitized UL and DL BB signals over the fronthaul link 230. For example, the UL channel signals and the DL channel signals are transported in units of radio frames. Both the RRU 210 and the BBU 220 may employ a similar optical transmission scheme and a similar optical detection scheme. For example, the optical transmission scheme may be an intensity modulation (IM) scheme and the optical detection scheme may be a direct-detection (DD) scheme.

The RRU 210 comprises a duplexer array 251, a plurality of upconverters (UCs) 211, a plurality of downconverters (DCs) 212, a plurality of digital-to-analog converters (DACs) 213, a plurality of analog-to-digital converters (ADCs) 214, a digital channel deaggregation unit 215, a digital channel aggregation unit 216, a high-speed ADC 254, a high-speed DAC 253, and an optical frontend 255. The duplexer array 251 is communicatively coupled to a plurality of antennas 242. The duplexer array 251 is an RF device or an RF component configured to separate the sending and receiving RF signals to and from the antennas 242. The optical frontend 255 comprises a plurality of power amplifiers (PAs) 217, a photodiode (PD) 218, a laser 219, and an optical circulator 252.

In a UL direction at the RRU 210, the DCs 212 are coupled to the duplexer array 251 and the ADCs 214 are coupled to the DCs 212. A DC 212 and ADC 214 pair operates on a UL channel signal received from an antenna 242, where the DC 212 downconverts the UL channel signal from an RF band into a BB to produce an analog BB signal. The ADCs 214 are configured to convert the analog BB signal into a digital BB signal. Specifically, each ADC 214 comprises two converters configured to convert the I and the Q component of the analog BB signal into a digital BB signal comprising IQ data samples. Thus, the digital BB signals comprise signal properties of the analog BB signals, which may comprise arbitrary waveforms. The digital channel aggregation unit 216 is coupled to the ADCs 214 and configured to aggregate the digital BB signals into an aggregated UL signal according to a channel aggregation scheme, as discussed more fully below. The high-speed DAC 253 is coupled to the digital channel aggregation unit 216 and configured to convert the aggregated UL signal into an analog electrical signal. It should be noted that the high-speed DAC 253 operates at a high sampling rate, for example, in the order of giga-samples per second (GSa/s) depending on the number of aggregated channels and the BWs of the channels, as discussed more fully below. A first of the PAs 217 is coupled to the high-speed DAC 253 and configured to amplify the aggregated UL signal to suitable voltage levels for transmission. The laser 219 is coupled to the first PA 217 and configured to modulate the aggregated UL signal onto an optical signal generated by the laser 219, for example, by employing an IM scheme. The optical circulator 252 couples the laser 219 and the PD 218 to the fronthaul link 230.

In a DL direction at the RRU 210, the PD 218 converts a received optical DL signal into an analog electrical signal, for example, by employing a DD scheme. The analog electrical signal comprises an aggregated DL BB signal. A second of the PAs 217 is coupled to the PD 218 and configured to amplify the electrical signal into suitable voltage levels for receiver processing. The high-speed ADC 254 is coupled to the second PA 217 and configured to convert the analog electrical signal into digital signals. Similar to the high-speed DAC 253, the high-speed ADC 254 operates at a high sampling rate in the order of GSa/s. The digital channel deaggregation unit 215 is coupled to the high-speed ADC 254 and configured to perform channel deaggregation according to the predetermined DL channel map to produce a plurality of the DL BB signals corresponding to the DL channels. The DACs 213 are coupled to the digital channel deaggregation unit 215 and configured to convert the I and the Q components of each of the DL channel signals into analog electrical signals. The UCs 211 are coupled to the DACs 213 and configured to upconvert the analog electrical signals from a BB to the original RF band for transmission via the antennas 242.

The BBU 220 comprises an optical frontend 265, a high-speed DAC 263, a high-speed ADC 264, a digital channel aggregation unit 226, a digital channel deaggregation unit 225, and a BB DSP unit 221. The optical frontend 265, the high-speed DAC 263, the high-speed ADC 264, the digital channel aggregation unit 226, and the digital channel deaggregation unit 225 are similar to the optical frontend 255, the high-speed DAC 253, the high-speed ADC 254, the digital channel aggregation unit 216, and the digital channel deaggregation unit 215, respectively. As shown, the UL path (shown as 281) of the BBU 220 and the DL path (shown as 272) of the RRU 210 are similar, while the DL path (shown as 282) of the BBU 220 and the UL path (shown as 271) of the RRU 210 are similar. However, the BBU 220 further comprises a BB DSP unit 221 coupled to the digital channel aggregation unit 226 and the digital channel deaggregation unit 225. The BB DSP unit 221 may comprise one or more single-core processors, one or more multi-core processors, one or more general processors, or one or more DSP processors. The BB DSP unit 221 is configured to perform BB DSP functions for the UL channels and the DL channels. For example, in the DL direction, the BB DSP unit 221 generates BB signals for DL channels based on DL packets received from a core network, such as the core network 150, and the digital channel aggregation unit 226 aggregates the DL BB signals. In the UL direction, the digital channel deaggregation unit 225 deaggregates the UL channel signals into multiple UL BB signals and the BB DSP unit 221 converts the UL BB signals into UL packets for transmission to the core network.

Figure 3:
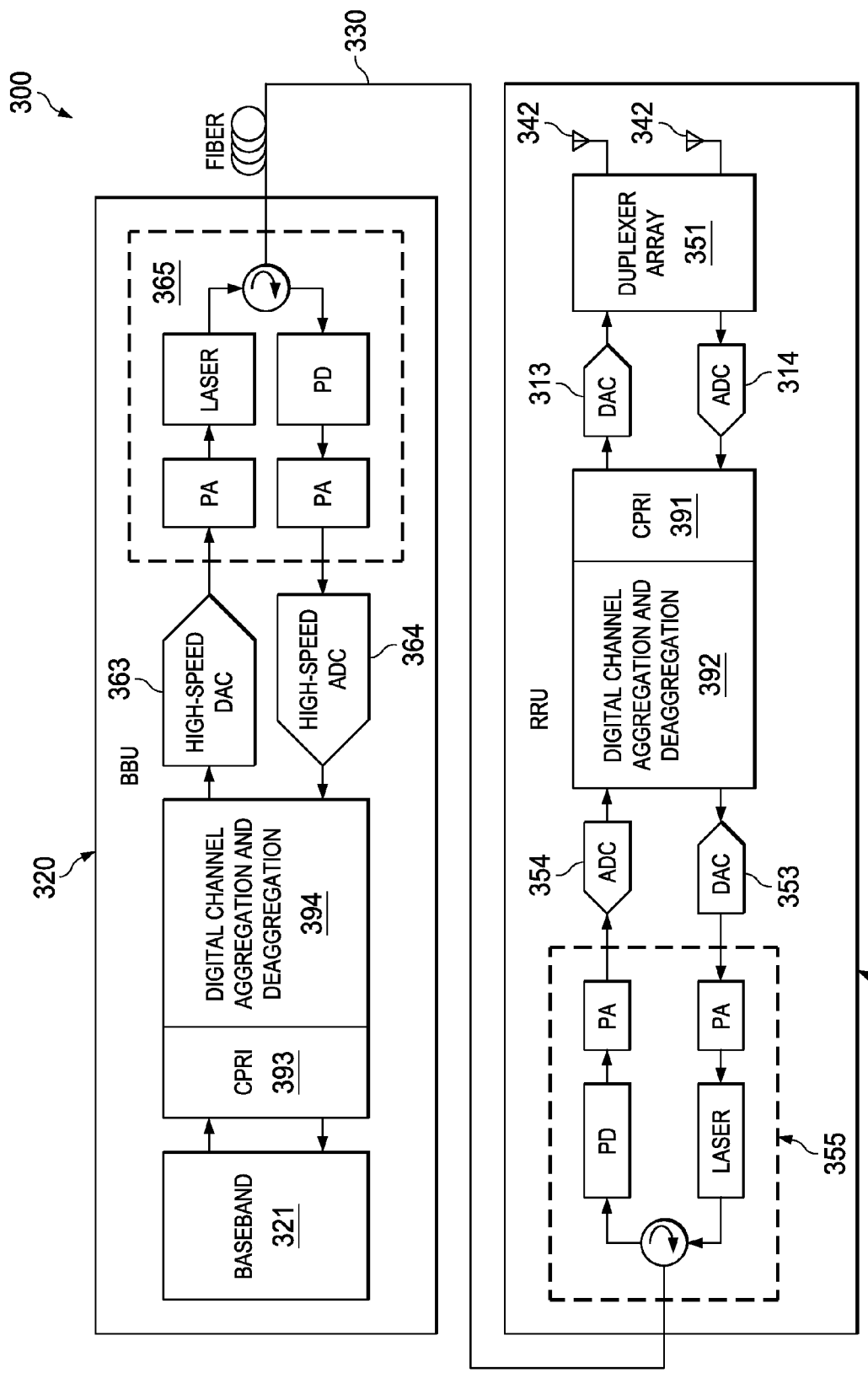
FIG. 3 is a schematic diagram of another aggregated wireless fronthaul communication system.

FIG. 3 is a schematic diagram of another aggregated wireless fronthaul communication system 300. The system 300 is similar to the system 200. However, the system 300 employs the CPRI protocol or a CPRI-like protocol to encode radio frames of UL and DL channel signals. The system 300 comprises an RRU 310 communicatively coupled to a BBU 320 through a fronthaul link 330. The RRU 310 is similar to the RRU 210, but comprises a first CPRI unit 391 that couples a first digital channel aggregation and deaggregation unit 392 to a DAC 313 and an ADC 314. The first digital channel aggregation and deaggregation unit 392 is configured to perform similar channel aggregation operations as the channel aggregation units 216 and 226 and similar channel deaggregation operations as the channel deaggregation units 215 and 225. The DAC 313 and the ADC 314 are similar to the DAC 213 and the ADC 214, respectively. The RRU 310 further comprises a duplexer array 351 similar to the duplexer array 251 that couples the DAC 313 and the ADC 314 to the plurality of antennas 342 similar to the antennas 142 and 242.

The first CPRI unit 391 is configured to perform CPRI encoding and decoding according to the CPRI specification. For example, a radio frame for a particular wireless RF channel is encoded into a CPRI encoded frame comprising an IQ data block and a CW. The IQ data block comprises IQ data sample bits corresponding to the particular wireless RF channel, and the CW comprises CPRI-related control information. The DAC 313 and the ADC 314 are similar to the DAC 213 and the ADC 214, respectively. The RRU 310 further comprises an ADC 354, a DAC 353, and an optical frontend 355 similar to the high-speed ADC 254, the high-speed DAC 253, and the optical frontend 255, respectively.

The BBU 320 is similar to the BBU 220, but comprises a second CPRI unit 393 that couples a second digital channel aggregation and deaggregation unit 394 to a BB DSP unit 321. The second CPRI unit 393 is similar to the first CPRI unit 391. The second digital channel aggregation and deaggregation unit 394 is similar to the first digital channel aggregation and deaggregation unit 393. The BB DSP 321 is similar to the BB DSP 221. The BBU 320 further comprises an optical frontend 365, a high-speed DAC 363, a high-speed ADC 364 similar to the optical frontend 255, the high-speed DAC 263, and the high-speed ADC 264, respectively. Since CPRI encoding includes both IQ data of the wireless RF channels and control information, both the IQ data and the control information are transported over the fronthaul link 330. The IQ data and the control information may comprise different error tolerances. For example, control information may require more robust transmission since the control information controls the transmission and equipment. Thus, a transmission scheme that satisfies error tolerances of both the IQ data and the control information is important for wireless fronthauls.

Disclosed herein are embodiments for providing an efficient and reliable transmission scheme and a high-performance decoding scheme for wireless fronthauls. In a wireless fronthaul system, digital IQ signals and control information associated with multiple wireless RF channel signals are transported over a wireless fronthaul link between RRUs and BBUs. The disclosed embodiments transmit the digital IQ signals and the control information in different multi-level modulation formats. For example, the digital IQ data is encoded in a pulse-code modulation (PCM) format and the control information is encoded in a predetermined low-level modulation format such as pulse-amplitude modulation (PAM), 4-quadrature-amplitude modulation (4-QAM), or 16-QAM. The multi-level modulation format allows for efficient transmission, and the predetermined low-level modulation format employed for the control information allows for reliable transmission. For example, a low-level or low-order modulation may provide a low bit error rate (BER) of about $10^{-12}$. As such, a receiver may receive the control information reliably without forward error correction (FEC), and thus may reduce processing complexity and latency. To further improve the transmission performance of the CWs, the CWs may be encoded by employing trellis-coded modulation (TCM). In addition, the disclosed embodiments allow for synchronous and simultaneous transmission of the digital IQ data and the control information by aggregating the digital IQ data and the control information associated with the same wireless RF channel signals. The disclosed embodiments employ a TDMA-based aggregation scheme to map or time-multiplex the digital IQ data and the control information to contiguous time slots. In an embodiment, the time-division multiplexing (TDM) is based on the periodic insertion of the modulated control information symbols into the modulated IQ data symbols to produce a time-domain symbol sequence. Furthermore, the disclosed embodiments employ a predetermined or known modulation format for the control information to facilitate channel estimation and equalization of the entire aggregated signal at a receiver. For example, upon receiving an aggregated signal comprising digital IQ data and control information, the receiver trains and updates a channel equalizer based on the control information portion of the received signal and applies the channel equalizer to the entire received signal to equalize the channel effect between a transmitter of the aggregated signal and the receiver. As such, the disclosed embodiments may achieve a high system performance. Although the present disclosure describes the control information or CWs in the context of the CPRI protocol or CPRI-like protocol over a wireless fronthaul link, the disclosed embodiments may be applied to any interface protocol over any communication link, such as a digital subscriber line (DSL) fronthaul link and a coaxial cable fronthaul link.

A TDMA-based channel aggregation/deaggregation scheme may provide several benefits when compared to a frequency-division multiple access (FDMA) based scheme. For example, TDMA is flexible for a fixed frame structure such as CPRI-encoded frames or for a packet-based transmission scheme such as 10 gigabit Ethernet (10 GE). In addition, TDMA is suitable for rate matching. For example, an oversampling ratio may be controlled to match the sampling rate of an ADC and/or a DAC, and a suitable amount of stuffing bits may be added when employing a frame-based wireless fronthaul transmission scheme. Furthermore, the architecture of a TDMA-based aggregated wireless fronthaul communication system is less complex than an FDMA-based aggregated wireless fronthaul communication system. For example, no mixers using discrete Fourier transform (DFT)/inverse-DFT (IDFT) are required to upconvert and/or downconvert the wireless RF channel signals.

Figure 4:
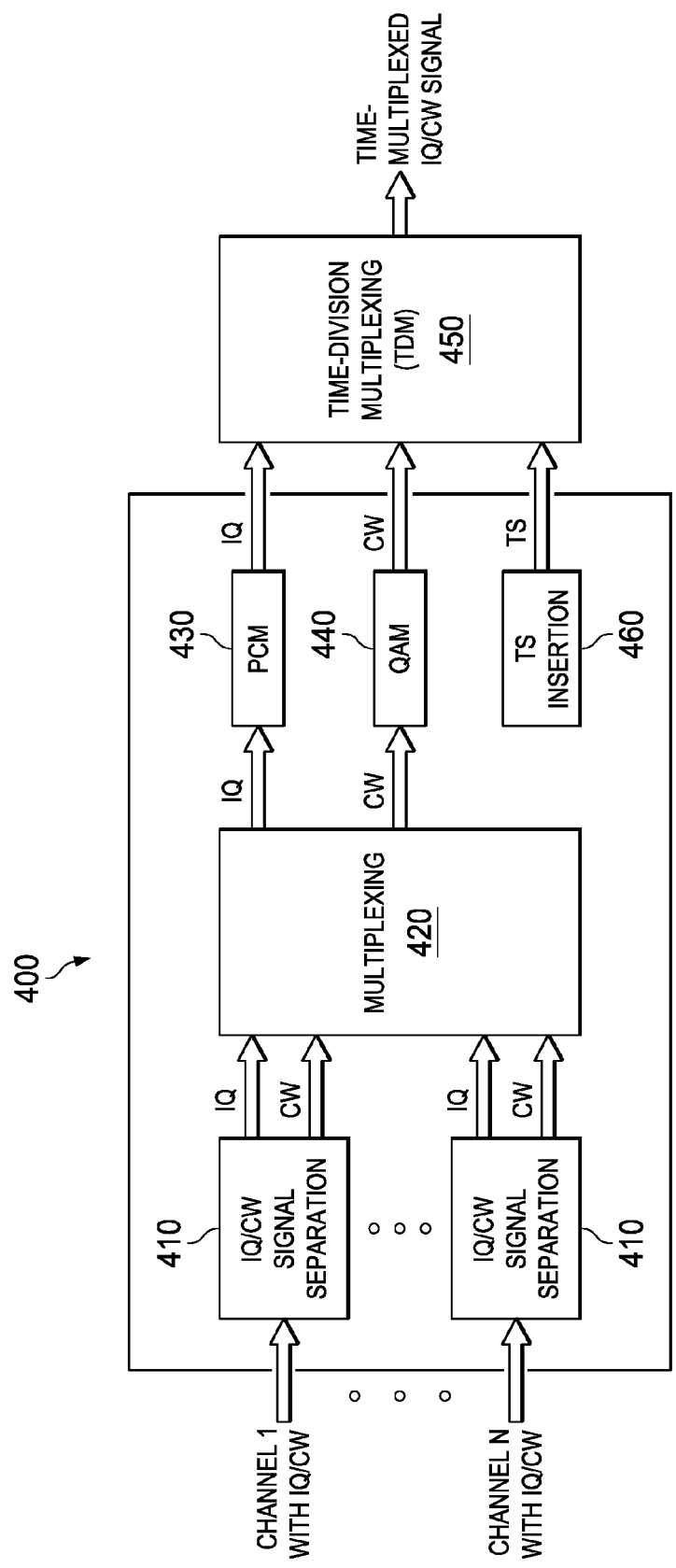
FIG. 4 is a schematic diagram of a time-division multiple access (TDMA)-based transmitter according to an embodiment of the disclosure.

FIG. 4 is a schematic diagram of a TDMA-based transmitter 400 according to an embodiment of the disclosure. The transmitter 400 is employed by an RRU such as the RRUs 110, 210, and 310, and a BBU such as the BBUs 120, 220, and 320. The transmitter 400 comprises a plurality of IQ/CW signal separation units 410, a multiplexing unit 420, a PCM encoding unit 430, a QAM encoder 440, a training symbol (TS) insertion unit 460, and a time-division multiplexing (TDM) unit 450.

Each IQ/CW signal separation unit 410 is configured to separate a combined IQ/CW signal corresponding to a particular wireless RF channel, depicted as Channel 1 to N, into an IQ portion and a CW portion. The IQ portion comprises digital IQ representations of the particular wireless RF channel, and the CW portion comprises control information associated with the particular wireless RF channel. The multiplexing unit 420 is coupled to the IQ/CW signal separation units 410 and configured to multiplex all the IQ portions associated with the wireless RF channels to form an aggregated IQ signal and multiplex all the CW portions associated with the wireless RF channels to form an aggregated CW signal according to a predetermined time slot schedule.

The PCM encoding unit 430 is coupled to the multiplexing unit 420 and configured to encode the aggregated IQ signal according to a PCM scheme to produce a PCM-coded IQ signal. The QAM encoder 440 is coupled to the multiplexing unit 420 and configured to encode the aggregated IQ signal according to a predetermined low-order QAM scheme such as a 4-QAM or 16-QAM scheme to produce a QAM-coded CW signal. For example, the aggregated IQ signal and the aggregated CW signal are transmitted on a frame-by-frame basis as IQ/CW frames. The TS insertion unit 460 is configured to insert TSs to the IQ/CW frames. For example, a TS may be a predetermined time sequence, which may be employed for frame detection and synchronization. In some embodiments, the transmitter 400 may employ additional control information insertion units (not shown) to insert additional control information, as discussed more fully below.

The TDM unit 450 is coupled to the PCM encoding unit 430, the QAM encoder 440, and TS insertion unit 460 and configured to time-multiplex the PCM-coded IQ signal, the QAM-coded CW signal, and the TSs into a time sequence, which is referred to as a time-multiplexed IQ/CW signal. In an embodiment, the modulated CW symbols and the TSs are periodically inserted between the modulated IQ data symbols to form the time multiplexed IQ/CW signal. The transmitter 400 may further comprise a frontend (not shown) similar to the frontends 255, 355, and 365. The frontend is configured to transmit the time-multiplexed IQ/CW signal by employing an optical IM scheme to carry the time-multiplexed IQ/CW signal in a single-carrier optical signal.

Figure 5:
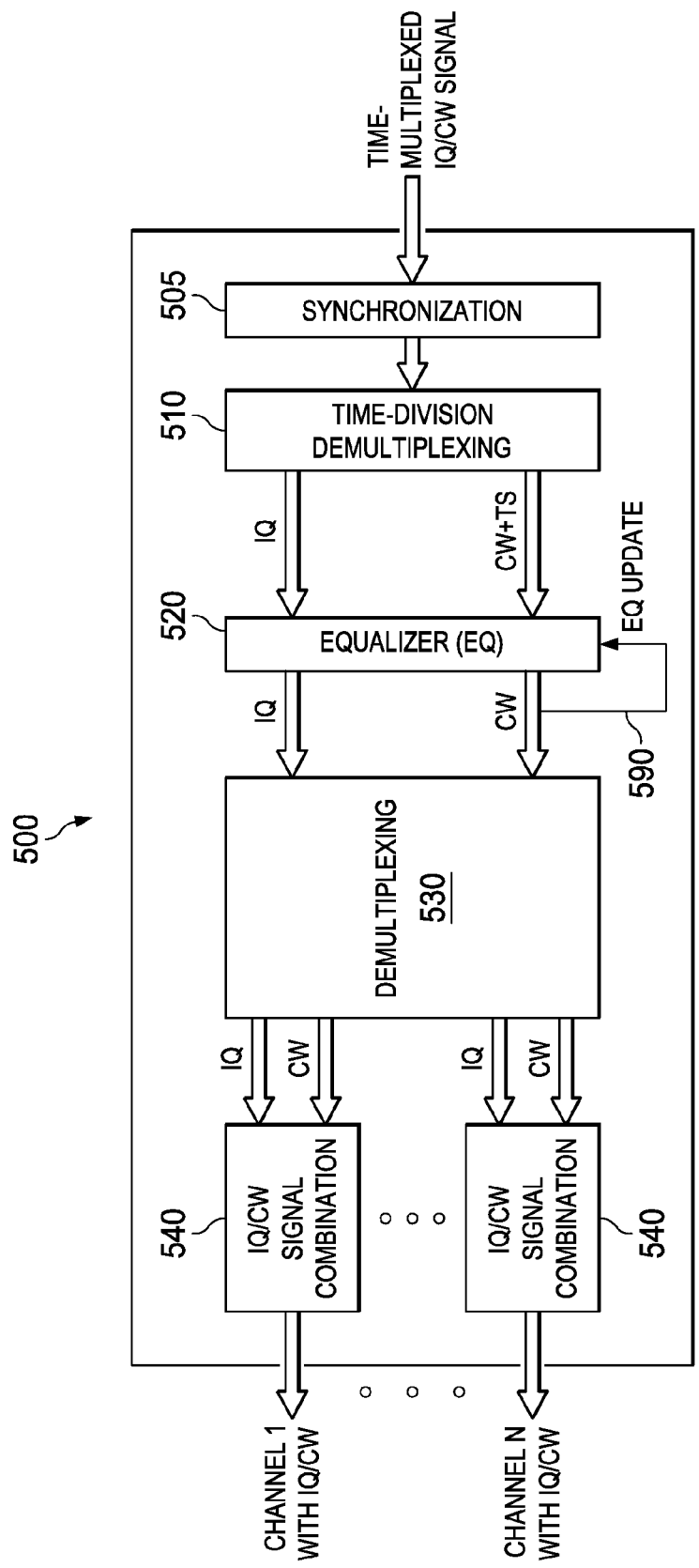
FIG. 5 is a schematic diagram of a TDMA-based receiver according to an embodiment of the disclosure.

FIG. 5 is a schematic diagram of a TDMA-based receiver 500 according to an embodiment of the disclosure. The receiver 500 is employed by an RRU such as the RRUs 110, 210, and 310, and a BBU such as the BBUs 120, 220, and 320 to demultiplex a time-multiplexed IQ/CW signal transmitted by a TDMA-based transmitter such as the transmitter 400. The receiver 500 comprises a synchronization unit 505, a time-division demultiplexing unit 510, an equalizer (EQ) 520, a demultiplexing unit 530, and a plurality of IQ/CW signal combination units 540.

The synchronization unit 505 is configured to receive a time-multiplexed IQ/CW signal, detect the beginning of a frame, and synchronize to the transmitter of the received signal, where the frame structure is discussed further below. The time-division demultiplexing unit 510 is coupled to the synchronization unit 505 and configured to perform time-division demultiplexing to obtain an IQ data signal and a CW signal. The equalizer 520 is coupled to the time-division demultiplexing unit 510 and configured to perform channel equalization on the IQ signal and the CW signal and to demodulate the CW signal according to a predetermined modulation scheme that is employed by a transmitter of the received time-multiplexed IQ/CW signal. Channel equalization removes or suppresses inter-symbol interference (ISI) or inter-sample interference. The equalizer 520 is trained and updated by feeding the demodulated CW signal back to the equalizer 520 as shown by the arrow 590.

The demultiplexing unit 530 is coupled to the equalizer 520 and configured to separate the demodulated IQ data signal into multiple IQ data signals and to separate the demodulated CW signal into multiple CW signals according to a predetermined time slot schedule that is employed by the transmitter. Each separated IQ signal and each CW signal correspond to a particular wireless RF channel. The plurality of IQ/CW signal combination units 540 are coupled to the demultiplexing unit 530 and configured to combine an IQ data and a CW for an associated wireless RF channel, depicted as Channel 1 to Channel N, into a single IQ/CW frame.

Figure 6:
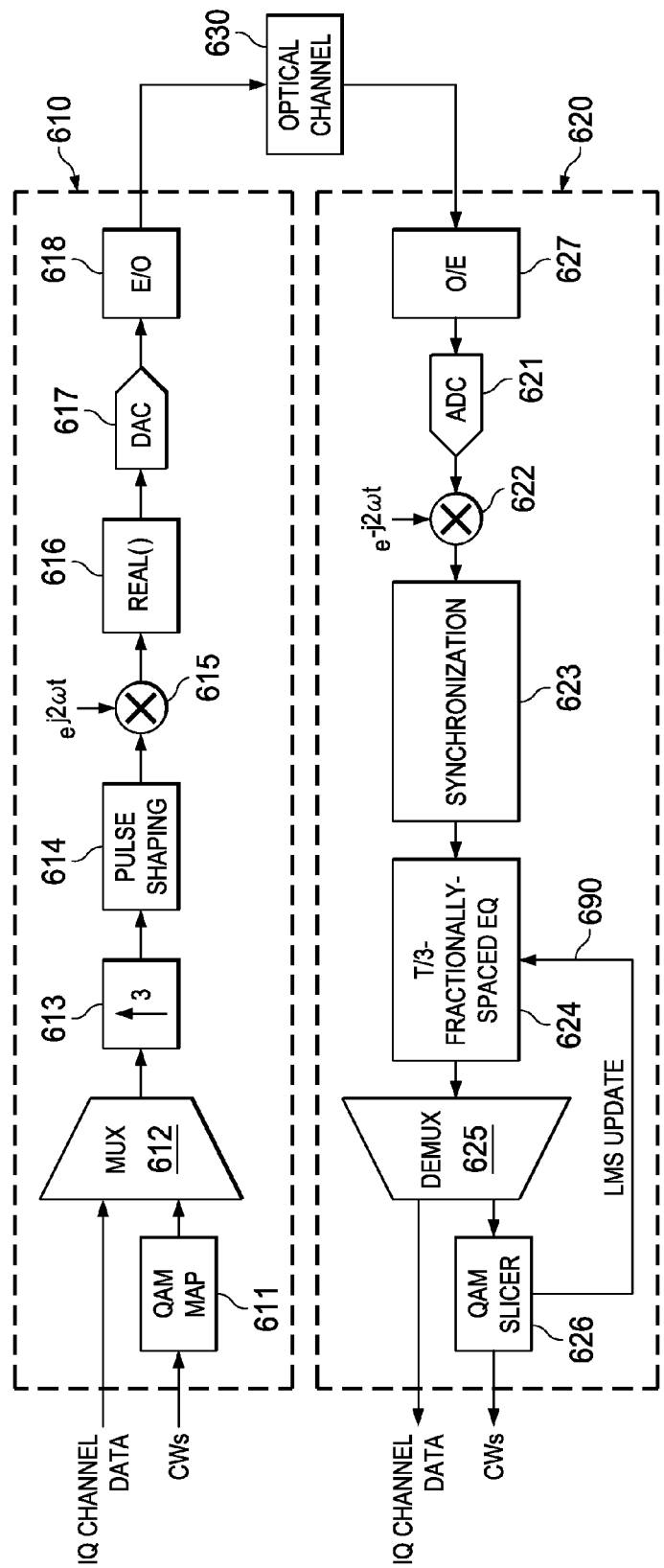
FIG. 6 is a schematic diagram of a TDMA-based wireless fronthaul communication system according to an embodiment of the disclosure.

FIG. 6 is a schematic diagram of a TDMA-based wireless fronthaul communication system 600 according to an embodiment of the disclosure. The system 600 is employed by a wireless fronthaul system such as the systems 100, 200, and 300. The system 600 comprises a transmitter 610 communicatively coupled to a receiver 620 by an optical channel 630. The transmitter 610 and the receiver 620 employ similar channel aggregation and deaggregation mechanisms and channel equalization mechanisms as the transmitter 400 and the receiver 500 described above. The transmitter 610 comprises a QAM mapping unit 611, a multiplexer (MUX) 612, an upsampling unit 613, a first pulse shaping unit 614, an upconverter 615, a real signal extraction unit 616, a DAC 617, and an electrical-to-optical (E/O) unit 618. The receiver 620 comprises an optical-to-electrical (O/E) unit 627, an ADC 621, a downconverter 622, a synchronization unit 623, a fractionally spaced equalizer (EQ) 624, a demultiplexer (DEMUX) 625, and a QAM slicer 626.

In a transmit path, the QAM mapping unit 611 is configured to encode CWs associated with a plurality of wireless RF channel signals according to a QAM scheme, such as 4-QAM or 16-QAM. The multiplexer 612 is coupled to the QAM mapping unit 611 and configured to multiplex the QAM-coded CWs with a plurality of IQ channel signals of the plurality of wireless RF channel signals to produce a multiplexed IQ/CW signal. The IQ channel signals comprise PCM samples, which are digital BB representations of the wireless RF channel signals. For example, the wireless RF channel signals may correspond to UL channel signals at an RRU or DL channel signals at a BBU. The upsampling unit 613 is coupled to the multiplexer 612 and configured to perform upsampling on the multiplexed IQ/CW signal. As shown, the upsampling unit 613 employs an upsampling ratio of 3. It should be noted that upsampling may ease filter cut-off in later stages when employing filters for upconverting BB signals to passbands signals. However, the upsampling unit 613 may be configured with a different upsampling ratio to achieve similar functionalities.

The first pulse shaping unit 614 is coupled to the upsampling unit 613 and configured to perform pulse shaping on the upsampled signal, for example, to limit the bandwidth of the upsampled signal. The upconverter 615 is coupled to the first pulse shaping unit 614 and configured to perform frequency upconversion on the pulse-shaped signal. The real signal extraction unit 616 is coupled to the upconverter 615. The output of the upconverter 615 is a complex signal. The real signal extraction unit 616 is configured to extract the real signal component of the complex signal. The DAC 617 is similar to the DACs 213 and 313 and is coupled to the real signal extraction unit 616. The DAC 617 is configured to convert the real signal component into an analog electrical signal. The E/O unit 618 is coupled to the DAC 617 and configured to convert the analog electrical signal into an optical signal for transmission over the optical channel 630. For example, the analog electrical signal may be modulated onto an optical carrier by employing an IM scheme.

In a receive path, the O/E unit 627 is configured to receive an optical signal from the optical channel 630 and converts the received optical signal into an analog electrical signal. The optical signal carries a multiplexed IQ/CW signal. The O/E unit 627 may employ a DD scheme. The ADC 621 is coupled to the O/E unit 627. The ADC 621 is similar to the ADCs 214 and 314 and is configured to convert the analog electrical signal into a digital signal. The downconverter 622 is coupled to the ADC 621 and configured to downconvert the digital signal to a baseband signal. The synchronization unit 623 is coupled to the downconverter 622 and configured to perform signal detection, synchronization, and normalization. For example, the signal detection detects the presence of the multiplexed IQ/CW signal, the signal synchronization synchronizes the receiver 620 to the transmitter 610, and the signal normalization normalizes the digital signal for further receiver processing. The fractionally spaced equalizer 624 is coupled to the synchronization unit 623 and configured to perform channel equalization. As shown, the fractionally spaced equalizer 624 performs a fractionally spaced equalization with a spacing of T/3, where T is the symbol period and T/3 is selected to match the upsampling ratio of 3 employed by the upsampling unit 613. The demultiplexer 625 is coupled to the fractionally spaced equalizer 624 and configured to separate the equalized signal into a plurality of IQ channel signals and a control channel signal. Each IQ channel signal corresponds to a particular wireless RF channel. The QAM slicer 626 is coupled to the demultiplexer 625 and configured to demodulate the control channel signal to produce CWs. As shown by the arrow 690, the CWs produced by the QAM slicer 626 may be employed to train and update the coefficients of the fractionally spaced equalizer 624 by employing a least mean square (LMS) algorithm or any other suitable adaptive algorithms.

Figure 7:
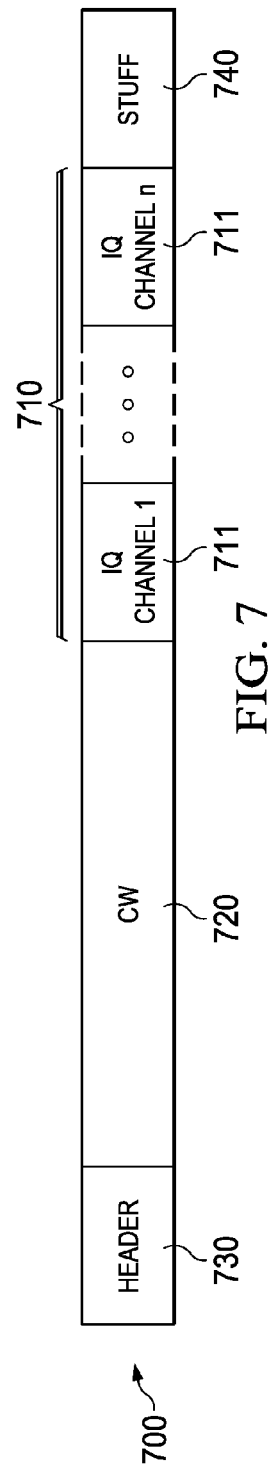
FIG. 7 is a schematic diagram of a structure of a wireless fronthaul data frame according to an embodiment of the disclosure.

FIG. 7 is a schematic diagram of a structure of a wireless fronthaul data frame 700 according to an embodiment of the disclosure. The frame 700 may be employed by an RRU such as the RRUs 110, 210, and 310, and a BBU such as the BBU 120, 220, and 320 to transport time-multiplexed IQ/CW signals over a wireless fronthaul link such as the fronthaul links 130, 230, and 330. An RRU or a BBU may employ a transmitter similar to the transmitters 400 and 610 and a receiver similar to the receivers 500 and 620. For example, at a transmitter, the frame 700 corresponds to a frame generated by a TDM unit such as the TDM unit 450. At a receiver, the frame 700 corresponds to a frame received by a time-division demultiplexing unit such as the time-division demultiplexing unit 510. As shown, the frame 700 comprises an IQ data portion 710, a CW portion 720, a header 730, and a stuffing bit portion 740.

The IQ data portion 710 comprises a plurality of data blocks 711, each corresponding to IQ data of a wireless RF channel, depicted as IQ channel 1 to n. For example, the IQ data are PCM samples comprising signal properties of the wireless RF channels. The CW portion 720 comprises one or more CWs carrying control and management information, which may facilitate transmission and reception of the data blocks 711. The header 730 carries additional control information. For example, the header 730 may indicate the size of the CW portion 720 and the size of the IQ data portion 710. In addition, the header 730 may carry synchronization symbols or TSs for TDMA frame synchronization or other fronthaul-related information. The stuffing portion 740 may be added to match a transmission rate when employing a frame-based transmission scheme. It should be noted that the frame 700 may be arranged as shown or alternatively configured as determined by a person of ordinary skill in the art to achieve similar functionalities. For example, interleaving may be performed over the frame 700.

Figures 8, 9:
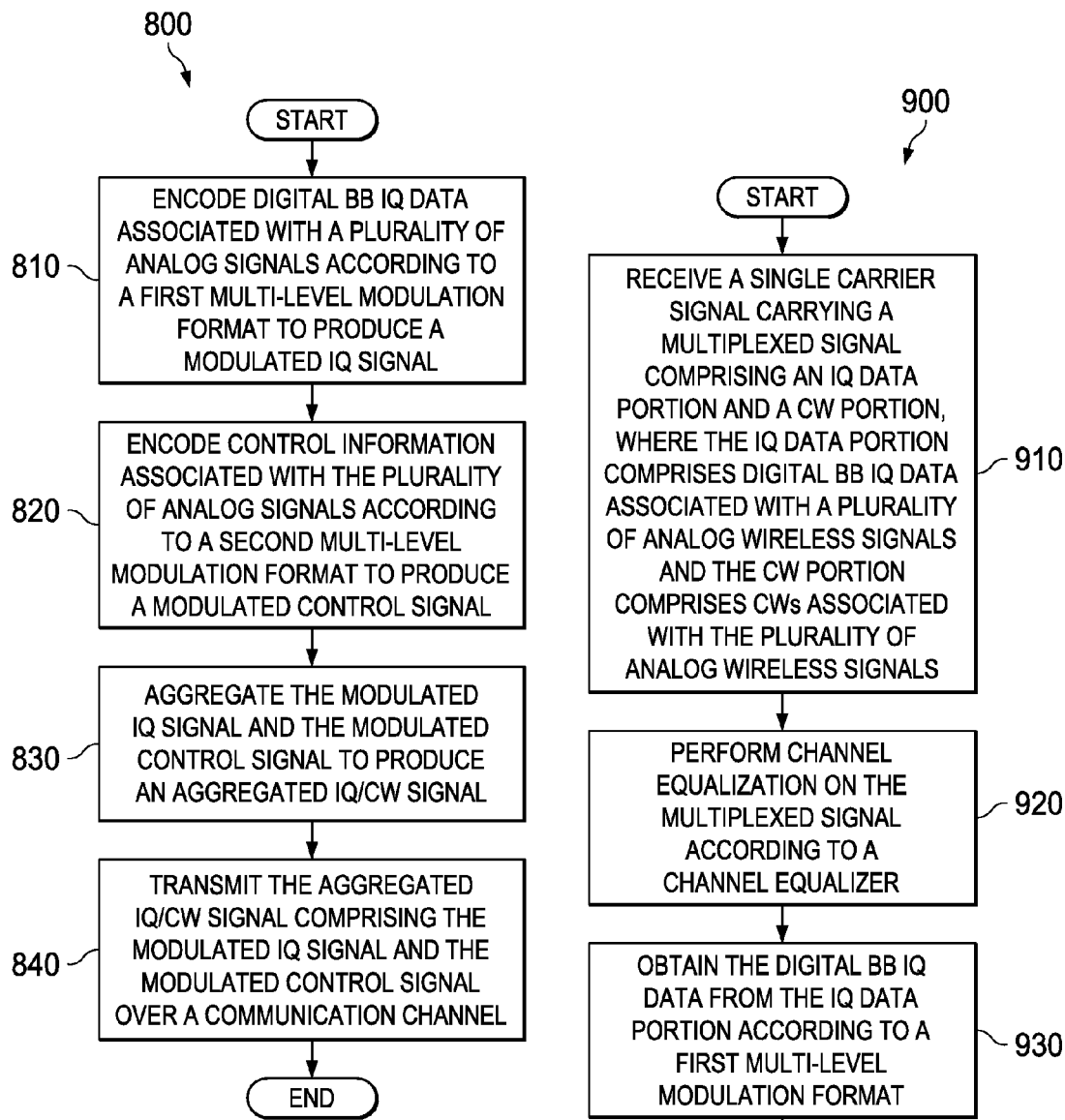
FIG. 8 is a flowchart of a method for transmitting in-phase and quadrature-phase (IQ) channel signals and control channel signal according to an embodiment of the disclosure.
FIG. 9 is a flowchart of a method for receiving IQ channel signals and control channel signal according to an embodiment of the disclosure.

FIG. 8 is a flowchart of a method 800 for transmitting IQ channel signals and control channel signals according to an embodiment of the disclosure. The method 800 is implemented by a transmitter such as the transmitters 400 and 610, which may be located at an RRU such as the RRUs 110, 200, and 300 or at a BBU such as the BBUs 120, 220, and 320. At an RRU, the method 800 is implemented after the RRU receives a plurality of UL channel signals via a plurality of antennas such as the antennas 142, 242, and 342. At a BBU, the method 800 is implemented after the BBU generates a plurality of digital IQ signals for a plurality of DL channels.

At step 810, digital IQ data associated with a plurality of analog signals are encoded according to a first multi-level modulation format to produce a modulated IQ signal. The analog signals correspond to the UL channel signals or the DL channel signals. The digital IQ data are an aggregation of digital IQ data of the analog signals. The first multi-level modulation format may be a PCM format.

At step 820, control information associated with the plurality of analog signals is encoded according to a second multi-level modulation format to produce a modulated control signal. The control information comprises control and management information associated with the plurality of analog signals and may enable a receiver to correctly receive and extract digital IQ data associated with each analog signal. The control information may be in the form of CWs. The second multi-level modulation format is a predetermined low-level modulation format such as a 4-QAM or 16-QAM format. The low-level modulation format allows for robust and high-quality transmission so that the CWs may be recovered correctly at a receiver without additional FEC.

At step 830, the modulated IQ signal and the modulated control signal are aggregated to produce an aggregated IQ/CW signal. For example, the aggregation is a TDMA-based aggregation as described in the TDMA-based transmitter 400. At step 840, the aggregated IQ/CW signal comprising the modulated IQ signal and the modulated control signal is transmitted over a communication channel, such as the wireless fronthaul links 130, 230, and 330. It should be noted that the predetermined format employed for encoding the control information enables a receiver to estimate the channel response of the communication channel and to equalize the effects of the communication channel. The aggregated IQ/CW signal may be sent over the communication channel in units of frames comprising similar structure as the frame 700, where the digital IQ data may be carried in the IQ data portion 710 and the control information may be carried in the CW portion 720. In addition to the CWs, TSs and additional control and management may be added to a frame as shown in the header 730 of the frame 700. Further, stuffing bits may be added to a frame to match a certain transmission rate as shown in the stuffing bit portion 740 of the frame 700. The method 800 may be applied to wireless fronthaul or other fronthaul, such as a DSL fronthaul and a coaxial cable fronthaul.

FIG. 9 is a flowchart of a method 900 for receiving IQ channel signals and control channel signal according to an embodiment of the disclosure. The method 900 is implemented by a receiver, such as the receiver 500, which may be located at an RRU, such as the RRUs 110, 210, and 310 or at a BBU, such as the BBUs 120, 220, and 320. The method 900 is implemented when receiving a signal from a wireless fronthaul link, such as the wireless fronthaul links 130, 230, and 330. At step 910, a single-carrier signal carrying a multiplexed signal comprising an IQ data portion and a CW portion is received. The IQ data portion comprises digital IQ data associated with a plurality of analog wireless signals and the CW portion comprises CWs associated with the plurality of analog wireless signals. The analog wireless signals may correspond to UL channel signals or DL channel signals. At step 920, channel equalization is performed on the multiplexed signal according to a channel equalizer. For example, the single-carrier signal is received from a communication link, such as the fronthaul links 130, 230, and 330 and the optical channel 630. The channel equalizer is configured to equalize or remove the effect of signal distortions caused by transmission over the communication link. At step 930, the digital IQ data is obtained from the IQ data portion according to a first multi-level modulation format. For example, the first multi-level modulation format is a PCM format. At step 940, the CWs are obtained from the CW portion according to a second multi-level modulation format. The second multi-level modulation format is a predetermined low-level modulation format, such as a 16-QAM format. At step 950, the channel equalizer is updated according to the CW portion of the time-multiplexed signal. For example, the channel equalizer may be a filter, where the filter coefficients are trained and updated according to the CW portion since the second multi-level modulation format is a predetermined QAM format. It should be noted that the PCM-coded IQ data portion comprises arbitrary waveforms, and thus may not be suitable for updating the channel equalizer. The method 900 may be applied to wireless fronthaul or other fronthaul, such as a DSL fronthaul and a coaxial cable fronthaul.

Figure 10:
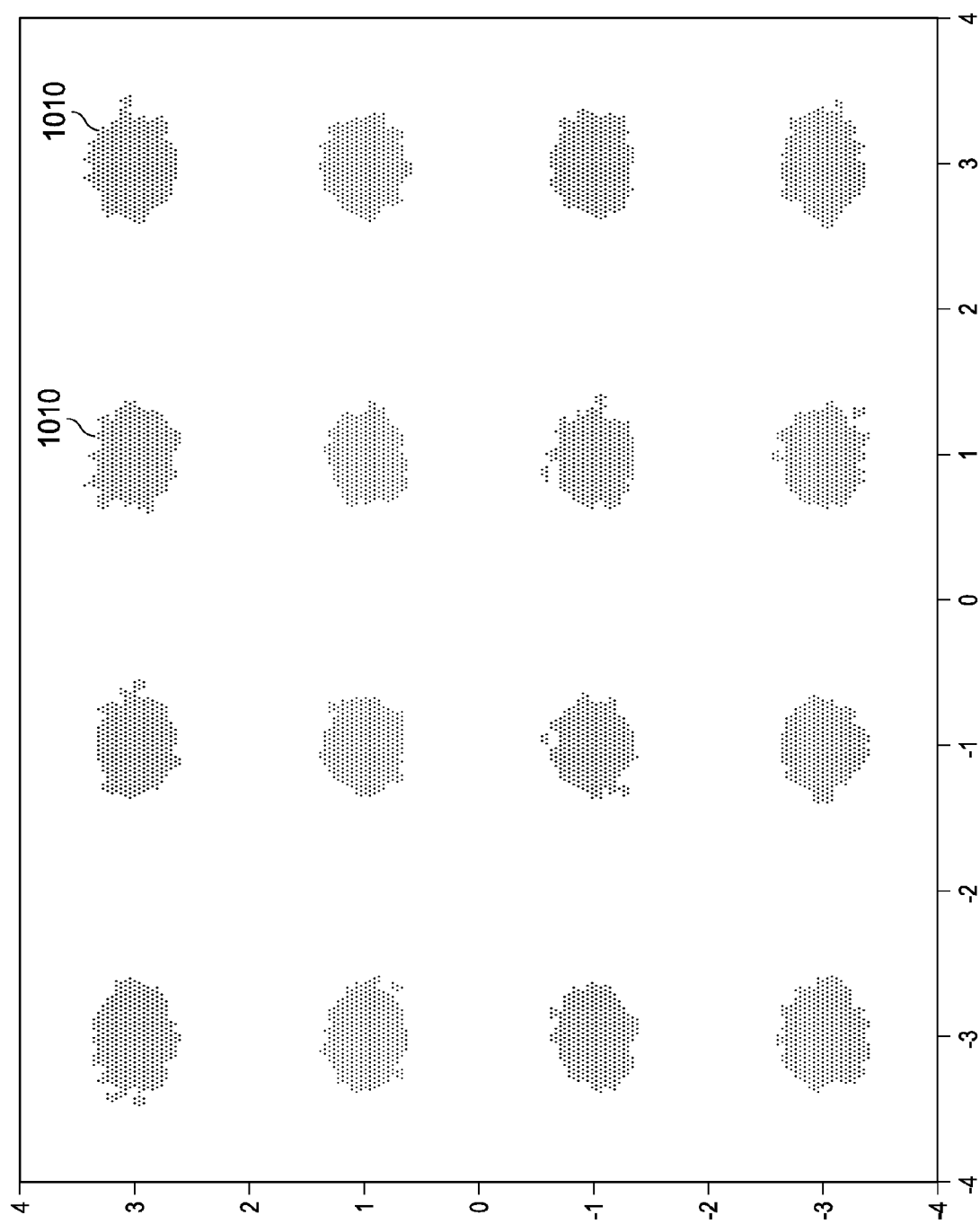
FIG. 10 is a graph illustrating a constellation plot of a control word (CW) channel with 16-quadrature-amplitude modulation (16-QAM) encoding.

FIG. 10 is a graph 1000 illustrating a constellation plot of a CW channel with 16-QAM encoding. In the graph 1000, the x-axis represents I components and the y-axis represents Q components, where the x-axis and the y-axis are in some constant units. The constellation points 1010 are captured at a receiver, such as the receivers 500 and 620, after transmission over an optical channel, such as the optical channel 630, which comprises a fiber length of about 5 kilometers (km). For example, the constellation points 1010 are captured at the output of a QAM slicer such as the QAM slicer 626. As shown, the constellation points 1010 are separated by substantial distances, where the received signal-to-noise ratio (SNR) is about 27.8 decibels (dB). Thus, the receiver may reliably recover the CWs carried in the CW channel without employing further FEC.

Figure 11:
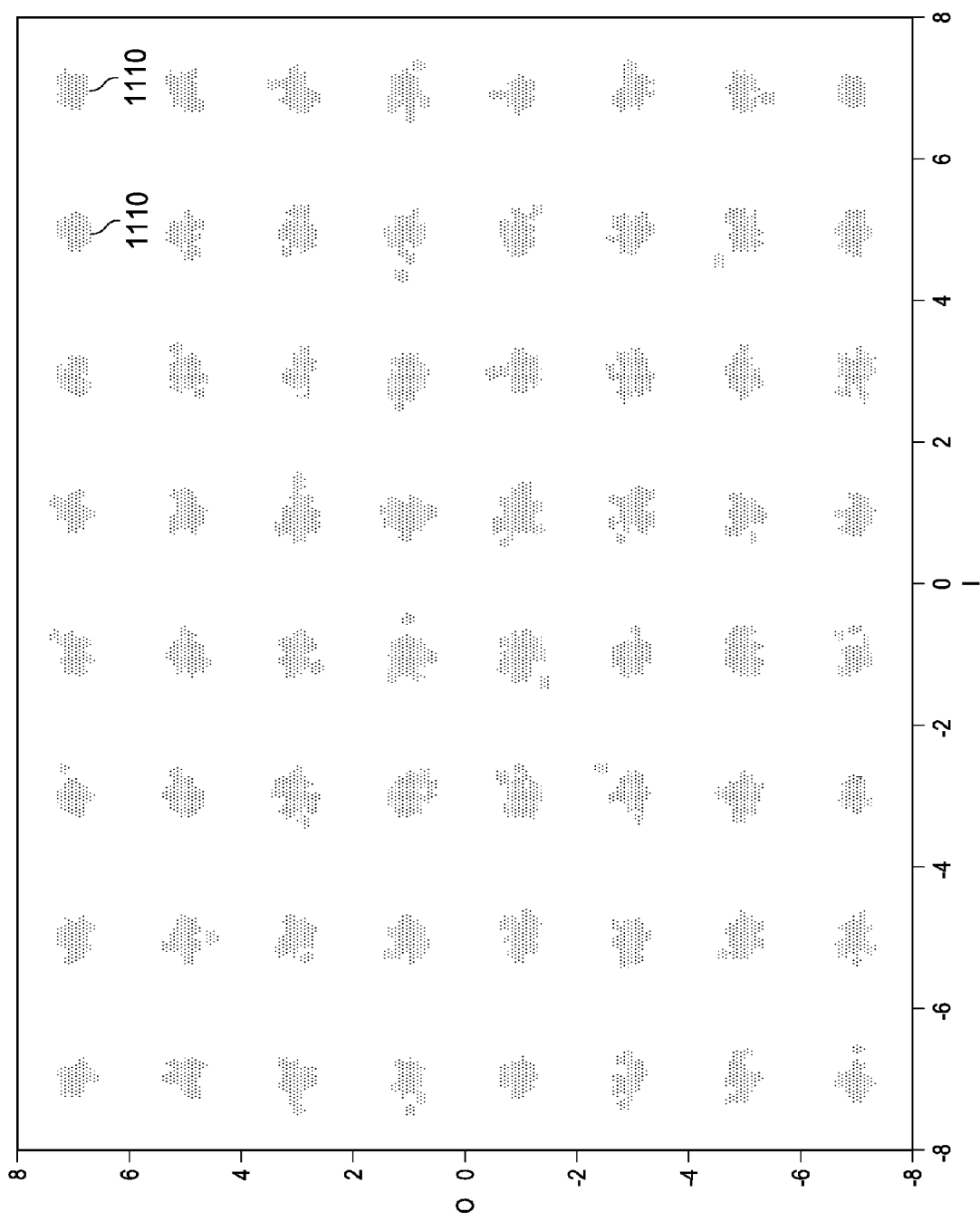
FIG. 11 is a graph illustrating a constellation plot of an IQ channel with 64-quadrature-amplitude modulation (64-QAM) encoding.

FIG. 11 is a graph 1100 illustrating a constellation plot of an IQ channel with 64-QAM encoding. In the graph 1100, the x-axis represents I components and the y-axis represents Q components, where the x-axis and the y-axis are in some constant units. The constellation points 1110 are captured at a receiver, such as the receivers 500 and 620. The constellation points 1110 and the constellation points 1010 are received from the same optical signal, thus both the CW channel and the IQ channel are received with the same SNR of about 27.8 dB. For example, the CW channel and the IQ channel are multiplexed at a transmitter similar to the transmitters 400 and 610. Comparing the graphs 1000 and 1100, the constellation points 1010 are separated by a greater distance than the constellation points 1110. Thus, the 16-QAM-coded CW channel provides a higher performance than the 64-QAM-coded IQ channel at the same SNR as expected.

Figure 12:
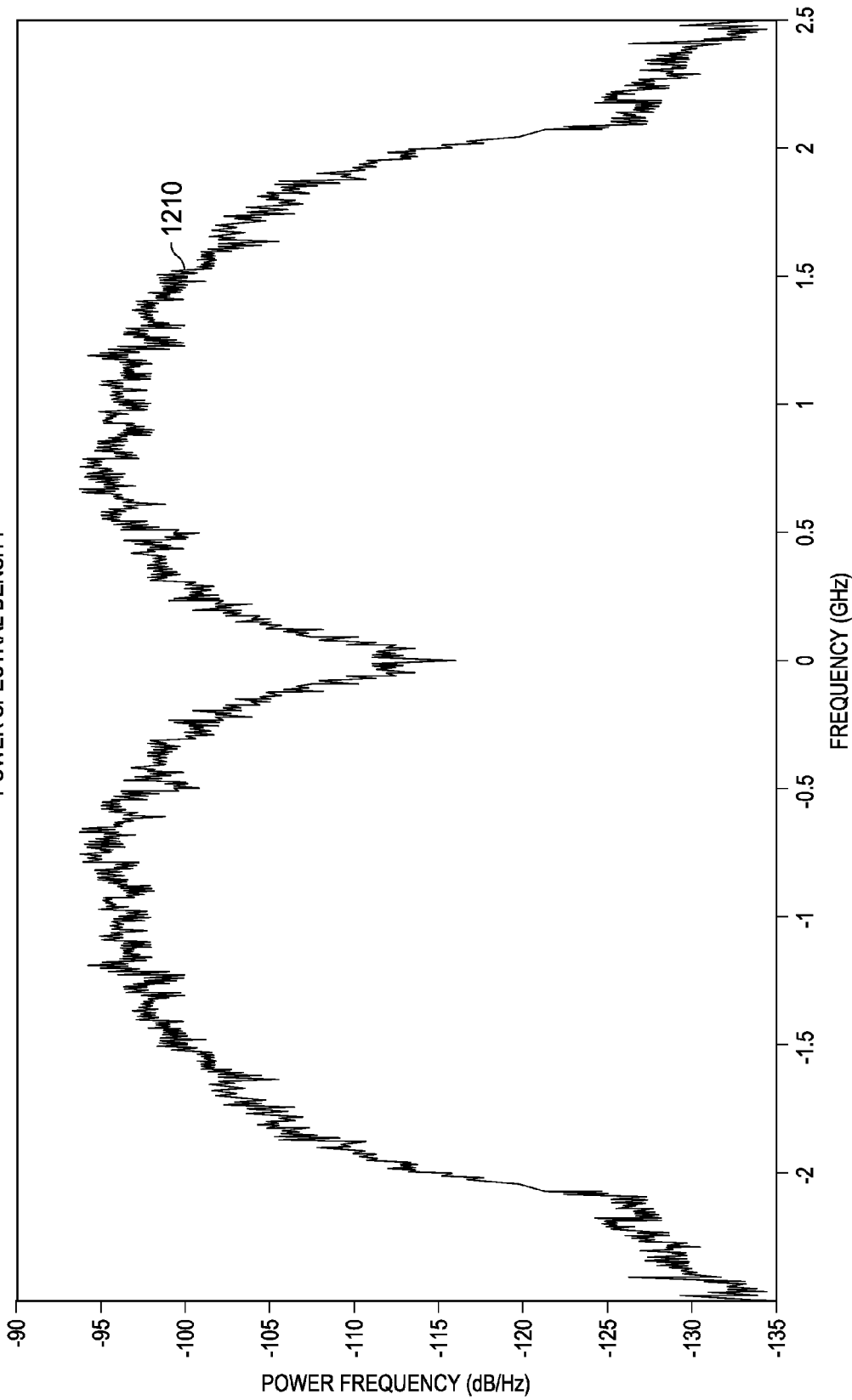
FIG. 12 is a graph illustrating a frequency spectrum of a TDMA-based aggregated wireless fronthaul signal.

FIG. 12 is a graph 1200 illustrating a frequency spectrum 1210 of a TDMA-based aggregated wireless fronthaul signal. In the graph 1200, the x-axis represents frequency in units of gigahertz (GHz) and the y-axis represents power in units of dB. The TDMA-based aggregated wireless fronthaul signal is a time-multiplexed IQ/CW signal generated by a TDMA-based transmitter such as the transmitters 400 and 610. As shown, the frequency spectrum 1210 comprises a single-carrier modulated spectrum in the positive frequency regime. In addition, the frequency spectrum 1210 is Hermitian symmetric in the frequency domain. Thus, the aggregated wireless fronthaul signal is real-valued. The aggregated wireless fronthaul signal may be converted to a positive-valued signal, thereby allowing a DD receiver to detect the signal. Thus, an IM transmitter and a DD receiver may be employed for transmitting and receiving the single-carrier TDMA signal, respectively.

Figure 13:
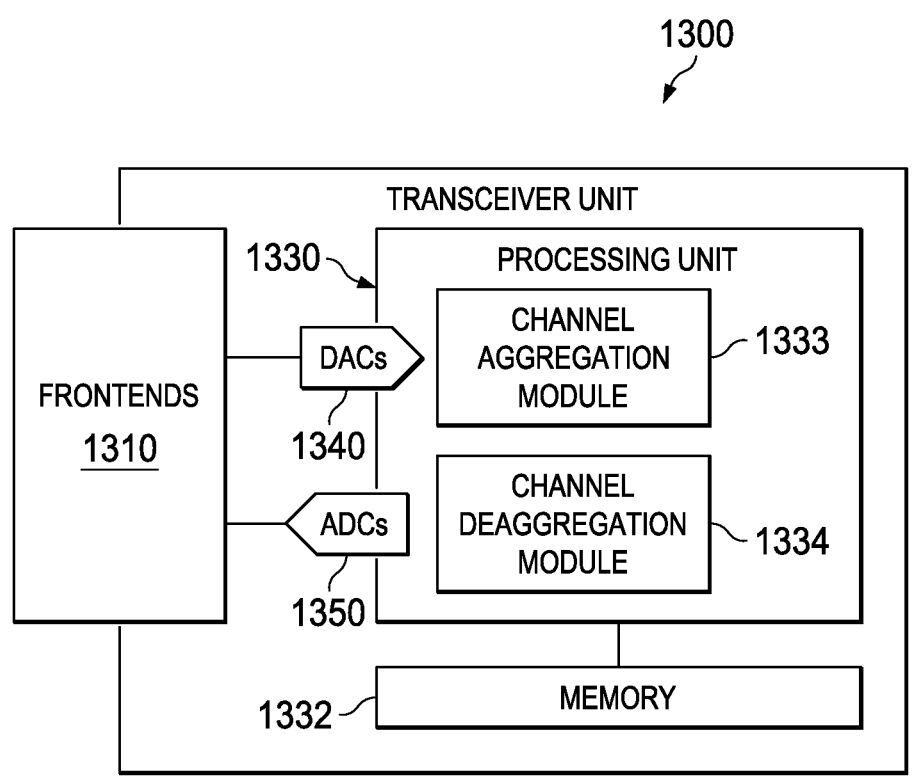
FIG. 13 is a schematic diagram of a wireless fronthaul transceiver unit.

FIG. 13 is a schematic diagram of an embodiment of a wireless fronthaul transceiver unit 1300, which may be any device that transmits and/or receives optical signals and/or RF signals. For example, the transceiver unit 1300 may be located in an optical communication device, such as the RRUs 110, 210, and 310 and the BBUs 120, 220, and 320, in a wireless fronthaul communication network system, such as the systems 100, 200, 300, and 600. The transceiver unit 1300 may also be configured to implement or support any of the described schemes. One skilled in the art will recognize that the term "transceiver unit" encompasses a broad range of devices of which transceiver unit 1300 is merely an example. The transceiver unit 1300 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 1300. For instance, the features and methods in the disclosure may be implemented using hardware, firmware, and/or software installed to run on hardware. As shown in FIG. 13, the transceiver unit 1300 may comprise a plurality of frontends 1310. The frontends 1310 may comprise an optical frontend (not shown) and an RF frontend (not shown). For example, the optical frontend may be similar to the optical frontends 255, 265, 355, and 365 and may comprise E/O components and O/E components, which may convert an electrical signal to an optical signal for transmission in a wireless fronthaul optical network and receive an optical signal from the wireless fronthaul network and convert the optical signal to an electrical signal, respectively. The RF frontend may comprise RF components, RF devices, and RF interfaces, which may receive and transmit wireless RF signals. A processing unit 1330 may be coupled to the frontends 1310 via a plurality of DACs 1340 and ADCs 1350. For example, the DACs 1340 may be similar to the DACs 213, 253, 263, 313, and 363. The ADCs 1350 may be similar to the ADCs 214, 254, 264, 314, and 364. The DACs 1340 may convert digital electrical signals generated by the processing unit 1330 into analog electrical signals that may be fed into the frontend 1310. The ADCs 1350 may convert analog electrical signals received from the frontends 1310 into digital electrical signals that may be processed by the processing unit 1330. In some embodiments, the ADCs 1350 and the DACs 1340 may be integrated with the processing unit 1330.

The processing unit 1330 may comprise one or more processors, which may include general processors, single-core processors, multi-core processors, application specific integrated circuits (ASICs), and/or DSPs. The processing unit 1330 may comprise a channel aggregation module 1333 and a channel deaggregation module 1334, which may implement the methods 1000 and 1100 and the channel aggregation and deaggregation schemes described herein. In an alternative embodiment, the channel aggregation module 1333 and the channel deaggregation module 1334 may be implemented as instructions stored in the memory module 1332, which may be executed by the processing unit 1330. The memory module 1332 may comprise a cache for temporarily storing content, for example, a random-access memory (RAM). Additionally, the memory module 1332 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof.

It is understood that by programming and/or loading executable instructions onto the transceiver unit 1300, at least one of the processing unit 1330 and/or memory module 1332 are changed, transforming the transceiver unit 1300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a transmitter, comprising:
   aggregating digital in-phase and quadrature-phase (IQ) data associated with a plurality of analog signals via a first time-division multiplexing (TDM) to produce an aggregated IQ data sequence;
   encoding the aggregated IQ data sequence according to a first multi-level modulation format to produce a modulated IQ signal;
   aggregating control information associated with the plurality of analog signals via the first TDM to produce an aggregated control sequence;
   encoding the aggregated control sequence according to a second multi-level modulation format that is different from the first multi-level modulation format to produce a modulated control signal;
   aggregating the modulated IQ signal and the modulated control signal via a second TDM to produce an aggregated TDM signal; and
   transmitting the aggregated TDM signal over a communication channel.

2. The method of claim 1, wherein the first multi-level modulation format is a pulse-code modulation (PCM) format, and wherein the second multi-level modulation format is a predetermined modulation format that enables estimation and equalization of the communication channel.

3. The method of claim 2, wherein the predetermined modulation format is a quadrature amplitude modulation (QAM)-based modulation format.

4. The method of claim 2, wherein the predetermined modulation format is a trellis-coded modulation (TCM) format.

5. The method of claim 1, wherein the IQ data are further associated with a digital baseband (BB) representation of the plurality of analog signals.

6. The method of claim 1, wherein the IQ data are further associated with a digital intermediate-frequency (IF) representation of the plurality of analog signals.

7. The method of claim 1, wherein the modulated IQ signal comprises modulated IQ data symbols, wherein the modulated control signal comprises modulated control information symbols, and wherein the aggregating the modulated IQ signal and the modulated control signal further comprises periodically inserting at least some of the modulated control information symbols between some of the modulated IQ data symbols to produce a time-domain symbol sequence.

8. The method of claim 7, further comprising adding a training symbol (TS) to the time-domain symbol sequence to enable synchronization and detection of the time-domain symbol sequence.

9. The method of claim 7, further comprising adding one or more stuffing bits to the time-domain symbol sequence to match a transmission rate.

10. The method of claim 1, wherein the second multi-level modulation format comprises a ore-determined low-level modulation format.

11. The method of claim 1, wherein the communication channel comprises an optical fiber link, a cable link, or a free-space link.

12. The method of claim 1, wherein the communication channel is a wireless fronthaul link, and wherein the plurality of analog signals corresponds to a plurality of antenna-carrier channel signals in a radio access network (RAN).

13. An apparatus comprising:
   a processor configured to:
      aggregate digital in-phase and quadrature-phase (IQ) data associated with a plurality of analog wireless signals via a first time-division multiplexing (TDM) to produce an aggregated IQ data sequence;
      encode the aggregated IQ data sequence according to a first multi-level modulation format to produce a modulated IQ signal;
      aggregate control words (CWs) comprising control information associated with the plurality of analog wireless signals via the first TDM to produce an aggregated control sequence;
      encode the aggregated control sequence according to a second multi-level modulation format that is different from the first multi-level modulation format to produce a modulated CW signal; and
      aggregate the modulated IQ signal and the modulated CW signal through time-a second TDM to produce an aggregated TDM signal; and
   a frontend coupled to the processor and configured to transmit the aggregated TDM signal over a communication link.

14. The apparatus of claim 13, wherein the first multi-level modulation format is a pulse-code modulation (PCM) format, and wherein the second multi-level modulation format is a predetermined quadrature amplitude modulation (QAM)-based modulation format.

15. The apparatus of claim 13, wherein the apparatus is a wireless fronthaul remote radio unit (RRU), and wherein the analog wireless signals are uplink (UL) signals.

16. The apparatus of claim 13, wherein the apparatus is a wireless fronthaul baseband unit (BBU), and wherein the analog wireless signals are downlink (DL) signals.

17. An apparatus comprising:
   a frontend configured to receive a single-carrier signal carrying a multiplexed signal comprising an in-phase and quadrature-phase (IQ) data portion and a control word (CW) portion, wherein the IQ data portion comprises digital IQ data associated with a plurality of analog wireless signals, and wherein the CW portion comprises CWs comprising control information associated with the plurality of analog wireless signals; and
   a processor coupled to the frontend and configured to:
      demultiplex the multiplexed signal to obtain the IQ data portion and the CW portion via a first time-division demultiplexing (TDM);
      update a channel equalizer according to the CW portion to obtain an updated channel equalizer;
      perform channel equalization on the multiplexed signal according to the updated channel equalizer;
      obtain the digital IQ data from the IQ data portion according to a first multi-level modulation format;
      obtain the CWs from the CW portion according to a second multi-level modulation format that is different from the first multi-level modulation format;

separate the digital IQ data into IQ data signals via a second TDM; and separate the CWs into CW signals via the second TDM.

18. The apparatus of claim 17, wherein the first multi-level modulation format is a pulse-code modulation (PCM) format, and wherein the second multi-level modulation format is a predetermined quadrature amplitude modulation (QAM) format.

19. The apparatus of claim 17, wherein the frontend is further configured to:

couple to a wireless fronthaul link; and receive the single-carrier signal via the wireless fronthaul link.

20. The apparatus of claim 17, wherein the apparatus is a receiver, and wherein the second TDM implements a predetermined time slot schedule employed by a transmitter associated with the receiver.

21. The apparatus of claim 17, wherein each IQ data signal is associated with a different radio frequency (RF) channel and a different one of the CW signals.

22. The method of claim 1, wherein the aggregated TDM signal comprises a frame, wherein the frame comprises an IQ data portion, a control word (CW) portion, and a header, wherein the IQ data portion comprises data blocks each corresponding to a different radio frequency (RF) channel, wherein the CW portion comprises CWs carrying control and management information that facilitates transmission and reception, and wherein the header comprises additional control information indicating a first size of the IQ data portion and a second size of the CW portion.

* * * * *

UNITED STATES PATENT AND TRADEMARK OFFICE
CERTIFICATE OF CORRECTION

PATENT NO. : 9,755,779 B2
APPLICATION NO. : 14/853478
DATED : September 5, 2017
INVENTOR(S) : Huaiyu Zeng et al.

Page 1 of 1

It is certified that error appears in the above-identified patent and that said Letters Patent is hereby corrected as shown below:

In the Claims

Column 18, Lines 1-3, Claim 10 should read:
10. The method of claim 1, wherein the second multi-level modulation format comprises a pre-determined low-level modulation format.

Column 18, Lines 12-34, Claim 13 should read:
13. An apparatus comprising:
a processor configured to:
    aggregate digital in-phase and quadrature-phase (IQ) data associated with a plurality of analog wireless signals via a first time-division multiplexing (TDM) to produce an aggregated IQ data sequence;
    encode the aggregated IQ data sequence according to a first multi-level modulation format to produce a modulated IQ signal;
    aggregate control words (CWs) comprising control information associated with the plurality of analog wireless signals via the first TDM to produce an aggregated control sequence;
    encode the aggregated control sequence according to a second multi-level modulation format that is different from the first multi-level modulation format to produce a modulated CW signal; and
    aggregate the modulated IQ signal and the modulated CW signal through a second TDM to produce an aggregated TDM signal; and
a frontend coupled to the processor and configured to transmit the aggregated TDM signal over a communication link.

Signed and Sealed this
Seventh Day of November, 2017

Joseph Matal
*Performing the Functions and Duties of the
Under Secretary of Commerce for Intellectual Property and
Director of the United States Patent and Trademark Office*